United States Patent

[11] 3,613,754

[72] Inventor Richard S. Hartley
    Troy, Ohio
[21] Appl. No. 8,231
[22] Filed Feb. 3, 1970
[45] Patented Oct. 19, 1971
[73] Assignee The Hobart Manufacturing Company
    Troy, Ohio

[54] FOOD SLICING MACHINE
    8 Claims, 7 Drawing Figs.
[52] U.S. Cl. .................................................. 146/102 L,
                                                            146/217
[51] Int. Cl. ..................................................... B26d 1/28,
                                                    B26d 4/36, B26d 5/42
[50] Field of Search .......................................... 146/102 R,
                            102 G, 102 L, 102 H, 94 R, 217, 113 D

[56] References Cited
    UNITED STATES PATENTS
    2,291,260   7/1942   Streckfuss et al. ............   146/102 L
    2,752,968   7/1956   Toby et al. .....................   146/217 X Primary Examiner—Willie G. Abercrombie
Attorney—Marechal, Biebel, French & Bugg ABSTRACT: A meat slicing machine has a base which supports an inclined rotary knife and a removable reciprocating carriage having an inclined material supporting surface extending parallel to the axis of the knife. The meat is advanced down the surface by a gripper having a plurality of depending prongs engaging the meat and supported by a pivotable arm slidably mounted on an inclined guide rod. The gripper and arm are fed by a follower engaging an inclined lead screw which is indexed during each return stroke of the carriage by oscillation of a one-way clutch having a finger extending for engagement with an adjustable stop mounted on the base.

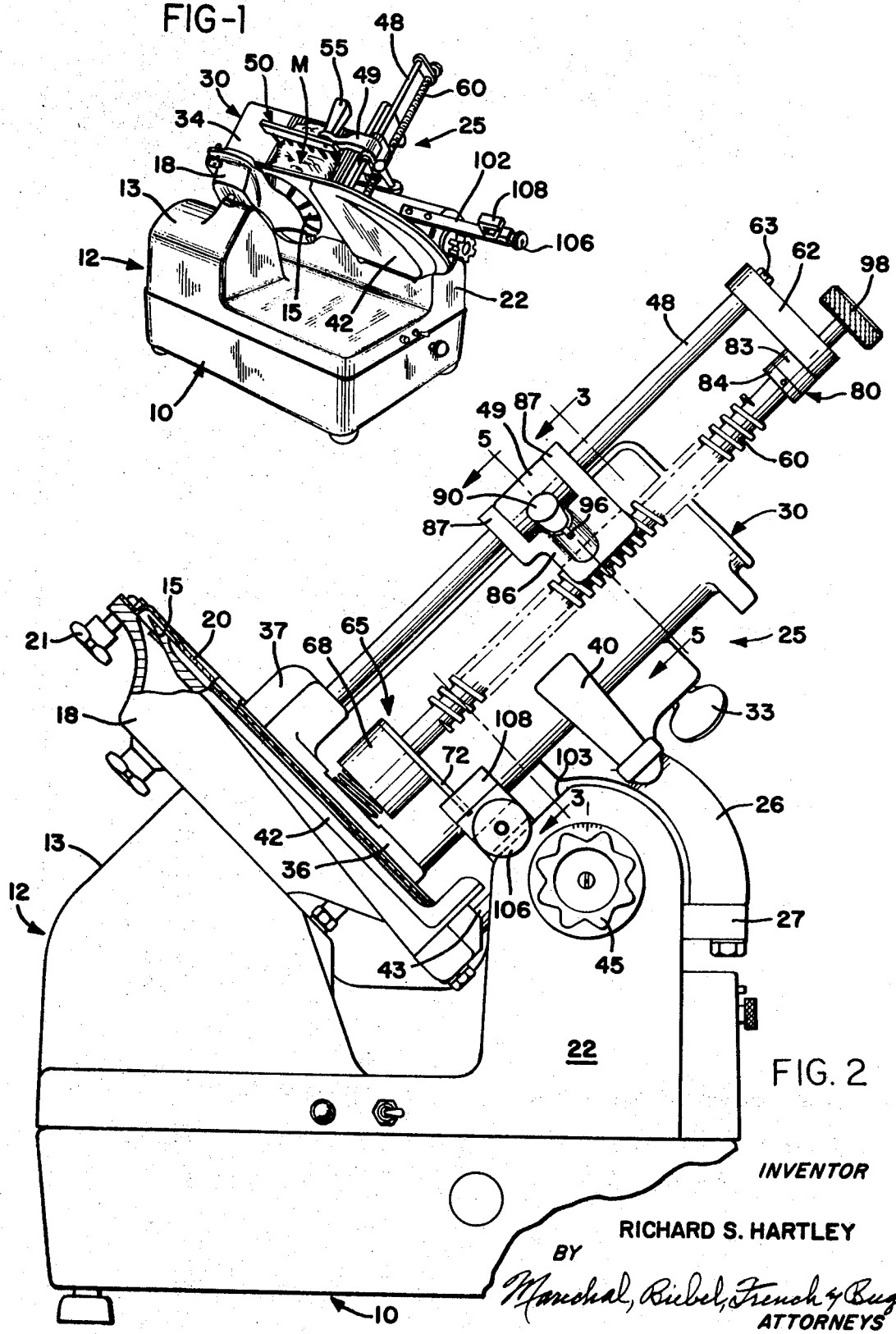

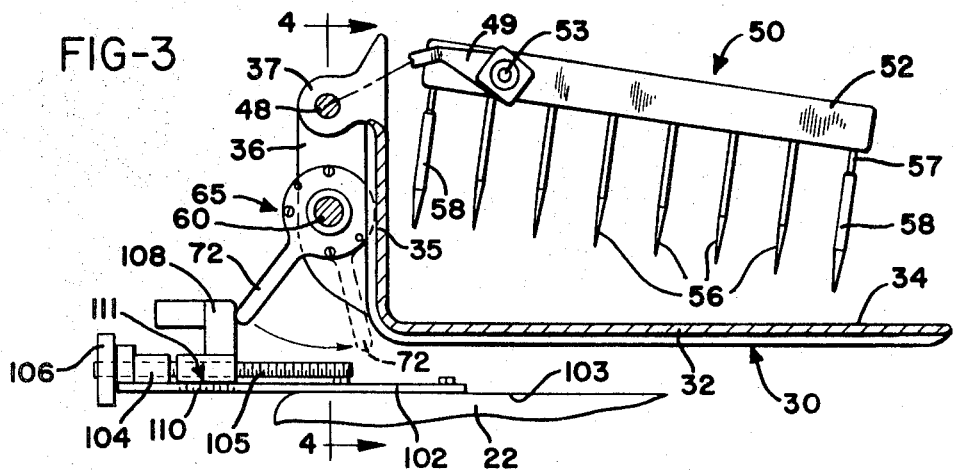
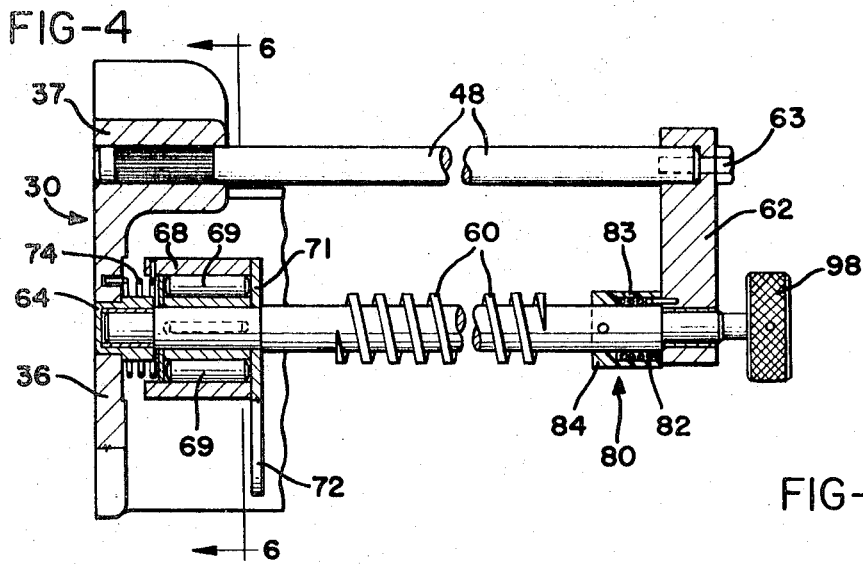
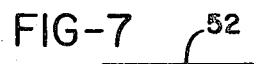
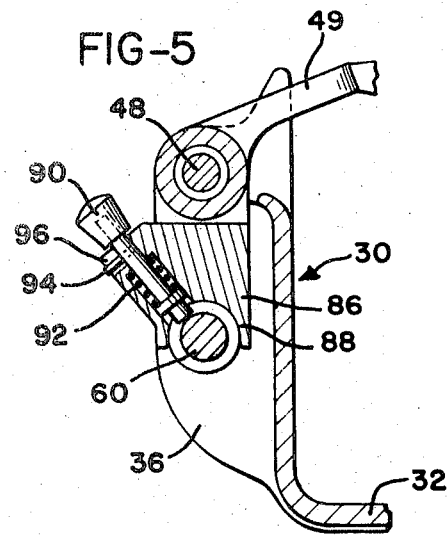
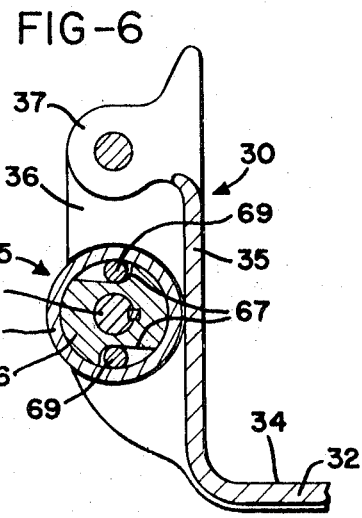

FOOD SLICING MACHINE

BACKGROUND OF THE INVENTION

In one form of meat slicing machine, a cross feed meat plate is mounted on a carriage which is reciprocated adjacent a rotary circular knife. The meat is secured to the meat plate by a vertically movable clamping member, and the meat plate is positively advanced towards the knife in a step-by-step manner by a cross feel mechanism, as for example, a cross feed screw mechanism such as disclosed in U.S. Pats. No. 1,284,684 and No. 1,626,902. In another form of slicing machine, such as disclosed in U.S. Pat. No. 2,752,968, the meat is gripped by a plurality of hooks projecting from a cross feed carriage supported adjacent an inclined surface extending from the path of an oscillating rotary knife.

Due to the complexity of the machines disclosed in the above patents and the difficulty in cleaning them, the construction of meat slicers has taken a more simplified form such as disclosed in U.S. Pat. No. 3,051,207 which issued to the assignee of the present invention. This slicing machine incorporates a reciprocating carriage having an inclined meat supporting surface which extends upwardly from an adjustable gauge plate. However, it has been found that when meat is sliced very thin or shredded on a gravity feed meat slicer such as shown in the latter patent, it is difficult to obtain slices which have a precisely uniform thickness. For example, with some cooked meats, there is a tendency for the meat to move upwardly on the meat supporting surface and away from the gauge plate causing the thickness of the slice to vary slightly.

SUMMARY OF THE INVENTION

The present invention is directed to a gravity feed slicing machine which incorporates an improved and simplified cross feel mechanism especially adapted for converting meat into thin slices of precisely uniform thickness. The slicing machine of the invention not only provides a simplified structure which effects positive and precisely controlled cross feed of the meat during each return stroke of the carriage, but also provides for convenient cleaning of the slicer including the cross feed mechanism.

In accordance with a preferred embodiment of the invention, a slicing machine incorporates an inclined circular cutting knife and a reciprocating carriage having a meat supporting surface extending parallel to the axis of the knife. A meat gripper includes a plurality of pointed prongs and is supported by an arm pivotally and slidably mounted on an inclined guide rod movable with the carriage and extending parallel to the meat supporting surface. An inclined lead screw extends below the guide rod in parallel spaced relation and is engaged by a retractable pin carried by a yoke member slidably mounted on the guide rod with the arm.

A one-way clutch is mounted on each end of the lead screw, and a finger extends from the lower clutch for engaging a stop member during each return stroke of the carriage. The stop member is supported by the base of the slicing machine and is infinitely adjustable between predetermined limits to control the degrees of rotation of the lead screw during each return stroke of the carriage. An adjustable gauge plate is supported adjacent the knife and is calibrated with the positive cross feed of the meat gripper and the inclined meat supporting surface of the carriage to assure that each slice has a precisely uniform thickness.

BRIEF DESCRIPTION OF THE DRAWINGS

FIG. 1 is a perspective view of a slicing machine constructed in accordance with the invention;

FIG. 2 is a front elevational view of the slicing machine shown in FIG. 1, with portions broken away;

FIG. 3 is a fragmentary section taken generally on the lines 3—3 of FIG. 2;

FIG. 4 is an enlarged fragmentary section taken generally on the line 4—4 of FIG. 3;

FIG. 5 is an enlarged section taken generally on the line 5—5 of FIG. 2;

FIG. 6 is a section taken generally on the line 6—6 of FIG. 4; and

FIG. 7 is a fragmentary section of the meat gripping member shown in FIG. 3.

DESCRIPTION OF THE PREFERRED EMBODIMENT

The slicing machine shown in FIG. 1 includes a rectangular hollow base 10 which supports a housing 12 having an upwardly projecting hollow portion for enclosing an electric motor (not shown) connected by gears to drive a circular cutting knife 15 inclined at an angle of approximately 45°. One side of the knife 15 is partially covered by a shroud 18 mounted on the housing portion 13 and the other side of the knife 15 is partially covered by a guard plate 20 removably secured to the shroud 18 by a thumb screw 21.

The housing 12 also includes an upwardly projecting longitudinally extending portion 22 which encloses a pair of guide rods (not shown) extending parallel to the knife 15. A carriage 25 is mounted on a curved support arm 26 which is secured to a slide member 27 slidably mounted on the guide rods. The carriage 25 includes an L-shaped meat tray 30 (FIG. 3) having a flat bottom wall 32 which is removably secured to the upper portion of the arm 26 by a wing screw 33. The bottom wall 32 defines a material or meat supporting surface 34 and is inclined in the opposite direction from the knife 15 so that it extends parallel to the rotational axis of the knife. The inclined bottom wall 32 of the meat tray 30 adjoins a vertical wall 35, and a flange 36 (FIG. 3) and a boss 37 project forwardly from the wall 35.

A handle 40 is secured to the arm 26 to provide for manually reciprocating the carriage through a feed stroke and a return stroke in relation to the knife 15. The carriage 25 may also be reciprocated by a harmonic drive mechanism enclosed within the base 10 as disclosed in the above Hartley U.S. Pat. No. 3,051,207. An inclined gauge plate 42 (FIGS. 1 and 2) is positioned parallel to the knife 15 and is supported by a pair of parallel spaced inclined rods 43 which extend parallel to the bottom wall 32 of the meat tray 30 as disclosed in the above Hartley patent. A calibrated dial 45 is mounted on a shaft (not shown) which projects through the front wall of the housing portion 22 and is rotated to adjust infinitely the position of the gauge plate 42 between predetermined limits in relation to the cutting edge of the knife 15.

In accordance with the present invention, a guide rod 48 (FIGS. 1 and 3) has its lower end supported by the boss 37 of the meat tray 30 and is inclined on the same angle as the bottom wall 32 of the meat tray 30. A pivotable arm 49 (FIGS. 1 and 3) is slidably mounted on the guide rod 48 and supports a meat gripping member or gripper 50 which includes a bar 52 pivotally connected to the arm 49 by a pin 53. A handle 55 is mounted on the pin 53, and a plurality of pointed prongs 56 depend from the bar 52 in parallel spaced relation. Referring to FIG. 7, the meat gripper 50 also includes a pair of end prongs 57 on each of which is mounted a pointed tip 58 formed of a low friction plastic material. The plastic tips 58 project below the points of the prong 56 and are adapted to engage the surface 34 of the meat tray 30 when the meat gripper 50 is released so that the pointed ends of the prongs 56 are protected and are prevented from scratching of the surface 34. An elongated inclined lead screw is positioned below the guide rod 48 in parallel spaced relation, and the upper end portion of the lead screw 60 is rotatably supported by a bracket 62 secured to the upper end of the guide rod 48 by a screw 63. A bearing 64 (FIG. 4) rotatably supports the lower end of the lead screw 60, and thus the lead screw 60 and the guide rod 48 are supported as a cantilevered unit from the flange 36 and boss 37 of the tray 30.

A one-way clutch 65 is mounted on the lower end portion of the lead screw 60 and includes a cam member 66 (FIG. 6) which is keyed to the lead screw and has a pair of diametrically opposed tapered cavities 67. A cylindrical sleeve or casing 68 surrounds the cam member 66 and confines cylindrical rollers 69 within the cavities 67. A plate 71 (FIG. 4) is secured to one end of the sleeve 68 and includes a downwardly extending finger 72. A retaining ring 73 is secured to the opposite end of the casing 68, and a torsion coil spring 74 surrounds the bearing 64. The spring 74 has one end connected to the casing 68 and an opposite end connected to the flange 36.

Another one-way clutch 80 is mounted on the upper end portion of the lead screw 60 adjacent the bracket 62 and includes a torsion coil spring 82 which is wound on the lead screw 60 and has one end connected to the bracket 62. A sleeve 83 surrounds the torsion spring 82 and is confined between the bracket 62 and a collar 84 secured to the lead screw. A yoke or follower member 86 (FIGS. 2 and 5) includes parallel spaced ears 87 which are slidably mounted on the guide rod 48 on opposite sides of the arm 49. A semicylindrical cavity 88 (FIG. 5) is formed within the follower member 86 and receives the lead screw 60. A retractable pin 90 is carried by the follower member 86 and has an inner end portion which is urged into engagement with the thread of the lead screw 60 by a compression spring 92 enclosed within a bore extending from the cavity 88. A cross pin 94 extends laterally from the pin 90 and is received within a slot 96 within the member 86 when the inner portion of the retractable pin 90 is in engagement with the lead screw 60.

When the pin 90 is retracted and is rotated a few degrees, the cross pin 94 is out of alignment with the slot 96 and thereby prevents the pin 90 from engaging the lead screw 60 so that the member 86, the arm 49 and the gripper 50 are free to slide on the guide rod 48. A knurled knob 98 is mounted on the upper end portion of the lead screw 60 and provides for manually rotating the lead screw and shifting the position of the gripper 50 when the pin 90 is in engagement with the lead screw.

Referring to FIGS. 2 and 3, a flat support member or bracket 102 is mounted on a flat surface 103 of the housing portion 22 and projects forwardly to support a bearing block 104. An elongated screw 105 is rotatably supported by the bearing block 104, and a knob 106 is secured to the forward end portion of the screw 105. An actuating member 108 has a threaded hole for receiving the screw 105 and it is positioned for engaging the finger 72 of the one-way clutch 65 when the carriage 25 is completing its return stroke to pivot the finger 72 and rotate the lead screw 60 in the direction of the arrow (FIG. 3).

A scale 110 is marked on the bracket 102 adjacent a pointer 111 on the actuating member 108 and is calibrated to indicate the extent of lateral movement of the meat gripper 50 during each return stroke of the carriage 25. Thus when the actuating member 108 is moved forwardly in relation to the housing 12, the rotation of the lead screw 60 during each return stroke of the carriage is reduced, and when the actuating member 108 is moved rearwardly, the rotation of the lead screw 60 is increased.

In operation, when a cooked or uncooked piece of meat M (FIG. 1) is to be shredded or sliced into very thin slices of uniform thickness, as for example, a thickness of one thirty-second inch, the meat M is placed on the inclined surface 34 of the meat tray 30, and the prongs 56 and 58 are inserted into the meat. The carriage drive is actuated so that the carriage 25 reciprocates through a feed stroke and a return stroke in relation to the rotary knife 15. As mentioned above, when the carriage 25 is completing its forward return stroke, the depending finger 72 of the one-way clutch 65 engages the actuating member 108 causing the lead screw 60 to rotate through a predetermined angle and the meat gripper 50 to advance toward the gauge plate 42 a predetermined distance according to the desired thickness of the slice. When the carriage 25 begins its rearward feed stroke, the finger 72 and the sleeve 68 of the one-way clutch 65 return to their home or normal position (FIG. 3) under the bias of the torsion spring 74, but the lead screw 60 is prevented from rotating backwards by the one-way clutch 80.

From the drawings and the above description, it is apparent that a slicing machine constructed in accordance with the invention provides desirable features and advantages. For example, the combination of the inclined meat supporting surface 34 and the positive advancement of the meat engaging member or gripper 50 by indexing of the lead screw 60 assures that the meat or material will be converted into slices of precisely uniform thickness. Furthermore, the mechanism which supports and advances the meat engaging member 50 is simplified in construction and is removable with the carriage tray 30 so that the mechanism can be conveniently washed with the tray.

The cooperation between the one-way clutches 65 and 80 also assures that the lead screw 60 is positively indexed through a precise predetermined angle so that the meat gripper 50 is advanced laterally in precise incremental steps corresponding to the desired thickness of the slices. Moreover, by calibrating the scale 110 with the scale on the knob 45, the operator of the slicing machine can conveniently set the plate 42 according to the incremental advancement of the meat gripper 50 to assure that each slice has a precise uniform thickness. Furthermore, the construction of the meat gripper 50 also provides a desirable feature. That is, the depending prongs 56 assure that the meat is positively advanced with the gripper 50, while the plastic tips 58 on the end prongs 57 protect the pointed ends of the prongs 56 and prevent scratching of the meat supporting surface 34.

While the form of apparatus herein described constitutes a preferred embodiment of the invention, it is to be understood that the invention is not limited to this precise form of apparatus, and that changes may be made therein without departing from the scope and spirit of the invention.

What is claimed is:

1. An improved slicing machine comprising a base, an inclined circular slicing knife rotatably supported by said base, a carriage having an inclined surface extending substantially parallel to the axis of said knife and adapted to support material to be sliced, means supporting said carriage for reciprocating movement of said surface adjacent said knife through a feed stroke and a return stroke, an inclined guide rod mounted on said carriage and extending substantially parallel to said surface, a gripping member having a plurality of prongs adapted to engage the material on said surface, an arm pivotally and slidably mounted on said guide rod and supporting said gripping member for lateral movement relative to said surface, an inclined elongated lead screw mounted on said carriage and extending generally parallel to said guide rod, means slidably mounted on said guide rod with said arm and engaging said lead screw to effect lateral movement of said gripping member and movement of the material downwardly on said surface in response to rotation of said screw, and means for indexing said lead screw in response to movement of said carriage for producing slices of precisely uniform thickness.

2. A slicing machine as defined in claim 1 in combination with an inclined gauge member positioned substantially parallel to said knife, and said gauge member being infinitely movable in relation to said knife for cooperating with the positive lateral fee of said gripping member to aid in producing slices of precisely uniform thickness.

3. A slicing machine as defined in claim 2 wherein said means for indexing said lead screw is infinitely adjustable between predetermined limits, and calibration means for correlating the position of said gauge member with the lateral advancement of said gripping member.

4. A slicing machine as defined in claim 1 wherein said means for indexing said lead screw include a one-way clutch connected to the lower end of said screw, a second one-way clutch connecting the upper end of said lead screw to said carriage, and an adjustable stop member mounted on said base and cooperating with said first said one-way clutch to effect predetermined indexing of said lead screw.

5. A slicing machine as defined in claim 1 including means for releasably securing said carriage to the corresponding said supporting means, and said guide rod, said screw and said gripping member all being removable with said carriage to facilitate cleaning thereof.

6. A slicing machine as defined in claim 1 including pivot means connecting said gripping member to said arm, said means engaging said screw comprise a yoke member including parallel spaced ears slidably mounted on said guide rod with said arm located therebetween, and a spring biased retractable plunger mounted on said yoke member and releasably engaging said screw to provide for lateral movement of said gripping member without rotating said screw.

7. A slicing machine as defined in claim 1 wherein said screw is positioned below said guide rod, means connected to the upper end portion of said guide rod and rotatably supporting said screw, and said carriage including means for supporting the lower end portions of said guide rod and said screw.

8. A slicing machine as defined in claim 1 wherein at least one of said prongs comprise a plastic member for engaging said surface of said carriage to protect said surface.